Oct. 2, 1923. 1,469,640
O. GRAFF
HEAD GAUGE FOR HATTERS
Filed July 11, 1922  2 Sheets-Sheet 1

Inventor:-
Oscar Graff.
by his Attorneys.

Oct. 2, 1923.                                                              1,469,640
                              O. GRAFF
                        HEAD GAUGE FOR HATTERS
                        Filed July 11, 1922          2 Sheets-Sheet 2
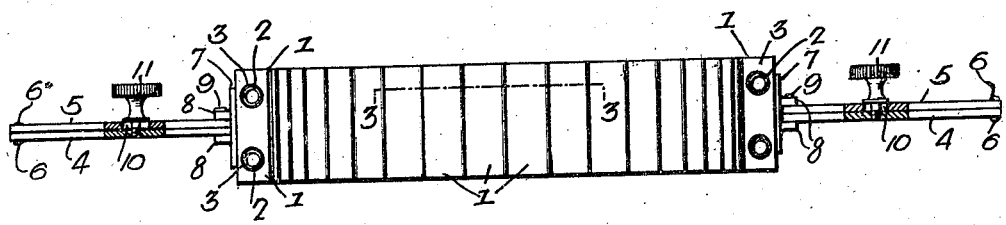
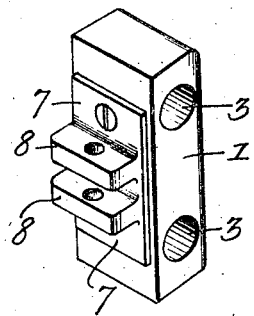
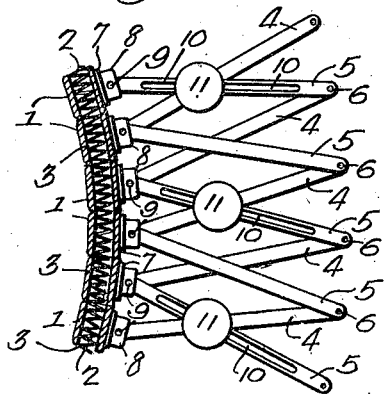
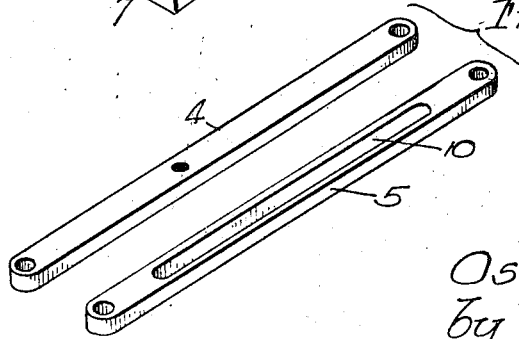
Inventor-
Oscar Graff.
by his Attorneys Patented Oct. 2, 1923.

1,469,640

UNITED STATES PATENT OFFICE.

OSCAR GRAFF, OF PHILADELPHIA, PENNSYLVANIA.

HEAD GAUGE FOR HATTERS.

Application filed July 11, 1922. Serial No. 574,257.

*To all whom it may concern:*

Be it known that I, OSCAR GRAFF, a citizen of the United States, residing in Philadelphia, Pennsylvania, have invented certain Improvements in Head Gauges for Hatters, of which the following is a specification.

The object of my invention is to simplify the construction of head gauges used by hatters in fitting a hat to the head and to provide means for holding the parts of the gauge in position after adjustment.

In the accompanying drawings:

Fig. 2 is a transverse sectional view;

Fig. 3 is a sectional plan view on the line 3—3, Fig. 2;

Fig. 4 is a perspective view of one of the blocks; and Fig. 5 is a detached perspective view of a pair of arms.

Figure 1:
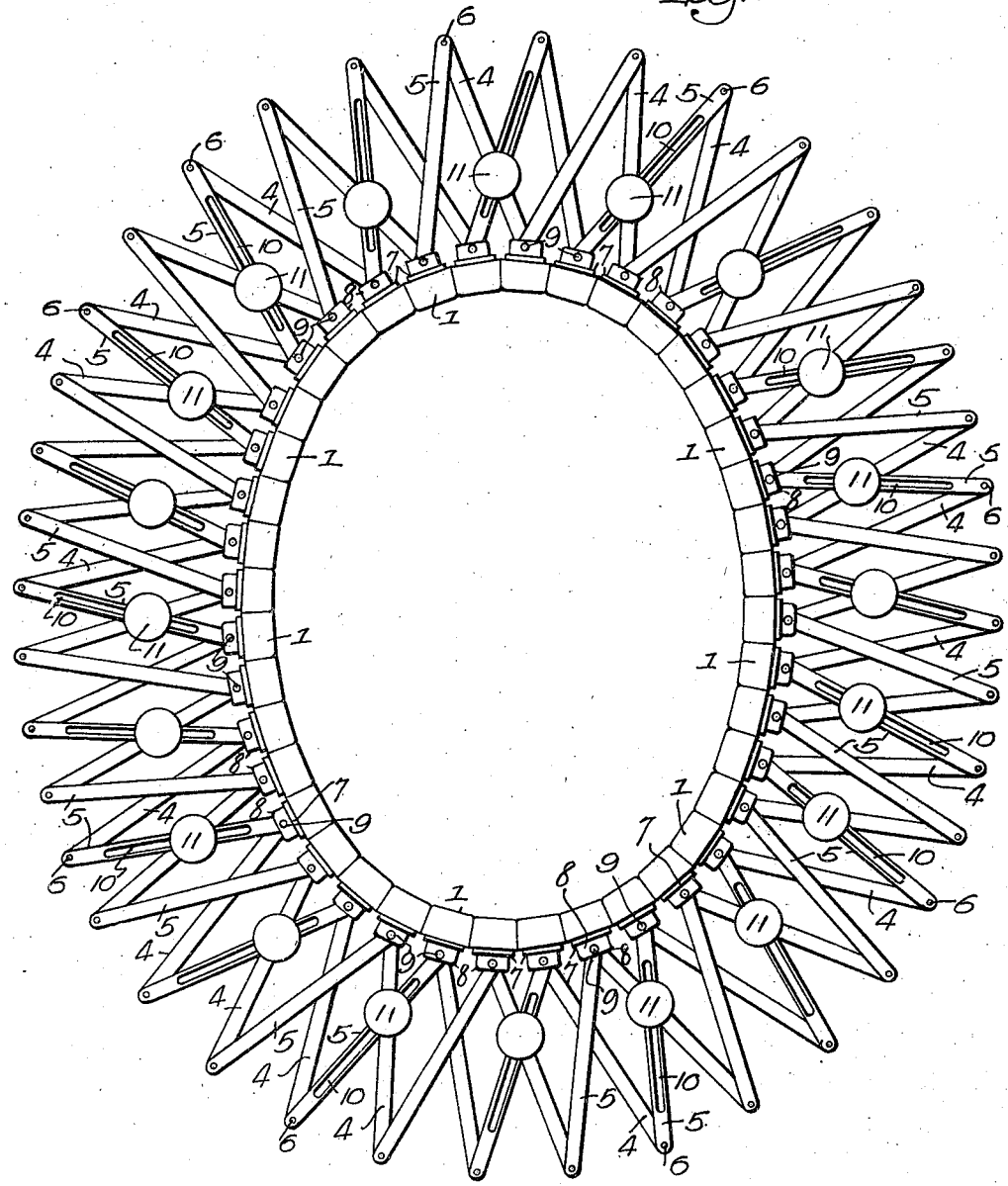
Fig. 1 is a plan view of my improved head gauge.

1 is a series of blocks, which, when assembled, as shown in Fig. 1, forms a complete ring—oval in shape to conform to the average head. These blocks are yieldingly held together by two coiled springs 2, which extend through openings 3 in the blocks. The springs 2 are comparatively light and yield when the gauge is forced onto the head of a person being fitted for a hat, the blocks conforming to the shape of the head.

In order to lock the blocks in position when on the head, arms 4 and 5 are provided. Each pair of arms is connected together at the outer ends by pivot pins 6.

At the back of each block is a plate 7 having perforated lugs 8. The arms are connected in pairs, as shown, to these lugs by pins 9. The arms are so coupled to the blocks and to each other that they form an annular lazy tongs, which will open as the blocks 1 are moved away from the center of the gauge and which will close as the gauge is contracted.

In the present instance, each alternate arm 5 is slotted at 10 and on each alternate arm 4 is a set screw 11, which extends through the slot 10 in one of the arms 5, as shown in Fig. 1.

When the gauge is adjusted to a head, the set screws are loose to allow the gauge to accommodate itself to the head. When the gauge is in proper position, the screws 11 are turned to clamp the arms together, locking the gauge in the position in which it is adjusted.

A head gauge, as hereinbefore described, is light and can be readily handled and quickly and accurately adjusted to the head of a person being fitted.

While my improved gauge is especially adapted for use by hatters, it will be understood that it can be used for other purposes without departing from the essential features of the invention.

I claim:

1. The combination in a head gauge for hatters, of a series of blocks assembled to form a ring; and two series of arms pivotally connected to the blocks, the arms of one series crossing those of the other series and the arms of one series being pivoted at their outer ends to the arms of the other series.

2. The combination in a head gauge for hatters, of a series of blocks assembled to form a ring, each block having an opening therein; a coiled spring in the form of a ring extending through the openings in the blocks; arms pivoted to the blocks and connected together; and means for locking the arms to hold the blocks in the position in which they are adjusted.

3. The combination in a head gauge for hatters, of a series of blocks assembled to form a ring; two sets of arms pivoted to the blocks, said arms crossing each other, the arms of one set being pivoted at their outer ends to the arms of the other set; and means clamping some of the arms of one set to the arms of the other set to hold the blocks in the position in which they are adjusted.

4. The combination in a head gauge for hatters, of a series of blocks; a coiled spring in the form of a ring tending to hold the blocks together yieldingly; two series of arms pivotally connected and connected to the blocks, forming an annular lazy tongs support for the blocks, certain of the said arms being slotted and others having set screws extending through the slots and arranged to clamp the arms and hold the gauge in the position in which it is adjusted.

OSCAR GRAFF.